Figure 1:
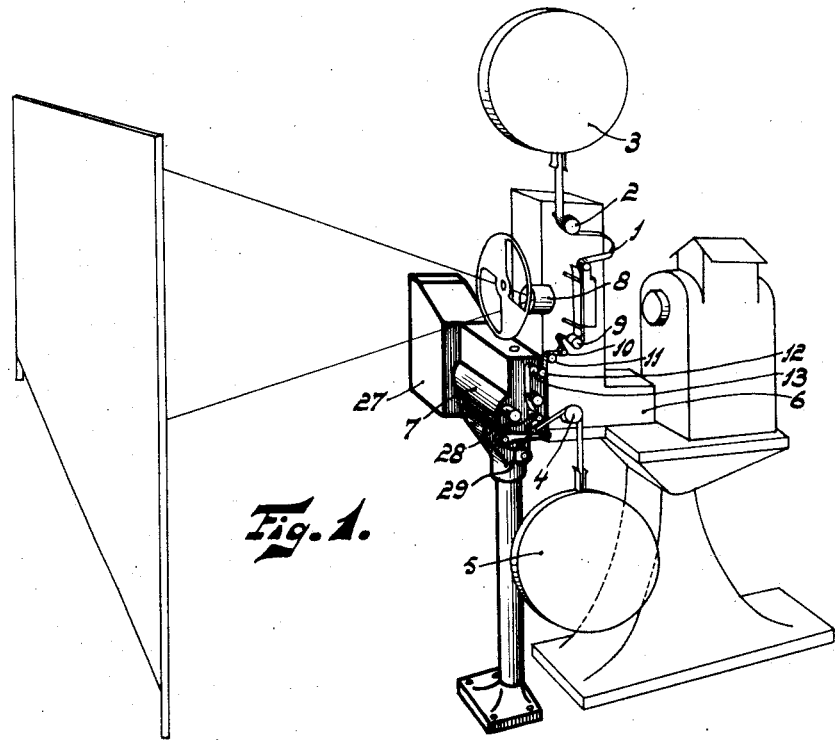

Inventors:
W. Six and
R. Vermeulen

Patented Nov. 12, 1935

2,020,857

UNITED STATES PATENT OFFICE 2,020,857

DEVICE FOR RECORDING OR REPRODUCING A SOUND FILM

Willem Six and Roelof Vermeulen, Eindhoven, Netherlands, assignors to N. V. Philips' Gloeilampenfabrieken, Eindhoven, Netherlands Application June 1, 1932, Serial No. 614,786
In the Netherlands June 9, 1931

4 Claims. (Cl. 179—100.3)

The invention relates to devices for recording or reproducing sound films. By sound films are meant hereinafter both films having only acoustic records and picture films furnished with such records.

The device according to the invention relates more particularly to a sound film installation in which the speed of the film at the sound-control point is kept constant, whereas the speed of the film portions before and behind the sound-control point is regulated in accordance with the difference between the speed at these latter points and that at the sound-control point. The terms "before" and "behind" have been selected in accordance with the direction of travel of the film.

The present application is a continuation in part of our copending application Ser. No. 595,646 filed February 27, 1932, and relates more particularly to an arrangement in which, in order to insure a constant film speed at the control point in a device of the above referred to type, a speed regulator is provided which has a given speed-braking curve, the speed-regulator being driven by the film and being located before or behind the sound-control point.

In the copending application of W. Six, R. Vermuelen and H. de Jong Ser. No. 614,787 filed June 1, 1932 there is described a sound picture apparatus in which the film is driven from a single motor both through the optical and through the acoustical part of the device, which motor is rigidly coupled with the transport rollers carrying the film. Our present invention is particularly well suited for such an installation.

It is common practice to use a fly-mass, for instance a fly-wheel driven by the film to maintain a constant film speed at the speed-control point. Such arrangement while largely eliminating transient fluctuations in the film speed, still does not insure a constant speed as it does not compensate for a continued increase or decrease of the driving force due, for instance to a deviation of the speed of the driving motor from its proper or designed speed.

By providing in accordance with the invention at the sound-control point a regulator, for instance, a speed-governor having a definite speed-braking curve which keeps the film at the sound-control point constant the above-stated objection is avoided. Such arrangement also eliminates the necessity of a fly-wheel and thus the difficulties experienced in starting, as for instance, that of film breakage, are avoided, as the mass of the governor is small compared with that of a fly-wheel.

The operation and the further advantages of the device according to the invention are given below:

Variations of the speed of the film portion located before the guide at the sound control point may be due not only to the intermittent travel of the film in the projection apparatus if a picture-sound film is used but in general also to variations of the friction which the film experiences during its travel before and behind the guide. If these variations are not too large, they are taken up by the regulator in such manner that the total friction at this point remains constant. An ordinary centrifugal regulator satisfies the requirements very well owing to the fact that its speed-braking force characteristic curve may be very steep, i. e. that with small variations of the speed the variations of the braking force may be very large.

The influence of variations in the speed of the driving means may be kept within suitable limits (within the operating range of the speed regulator); for instance, by means of a device which is located behind the guide and which so controls the speed of the driving motor that a substantially constant force is exerted on the film when passing the sound-control point. Such arrangement makes it possible to always maintain the film speed constant at this point, and to always maintain a desired constant pressure between the film and the guide.

For this purpose a loop may be provided in that portion of the film which falls behind the guide whereby the loop is stretched by a roll mounted on a spring-biased movable lever. The lever is provided with a contact member which cooperates with a second contact member, the latter member being, for instance, periodically moved by the speed-regulator shaft and the cooperation of the two contact members controls the speed of the driving motor. The control of the speed may be effected, for example, by interrupting and closing the electrical contact between the two contact members, whereby a resistance included in the circuit of an electromotor which drives the film, is periodically short-circuited. In principle, the movement of the one contact member need not be derived from the regulator shaft. It is, however, advisable to do so to make the whole controlling device as compact as possible.

It has already been suggested to use a loop of the film together with the stretching roll secured on a movable and spring-biased lever for the regulation of the film speed at the sound guide. However, such regulating means have never been utilized for the regulation of the speed of the driving motor nor has it been proposed to use the regulating action of such a loop in combination with other means to insure a constant pressure between the film and its guide at the sound-control point, and to obtain at the same time an absolutely constant film speed at the sound gate.

With applicants' arrangement, irrespective of any variation in the driving speed, either variations in pressure or speed at the sound-control point are avoided.

It will appear that with the arrangement of the invention, whether used in recording or reproducing a picture or sound film, a perfect synchronism between picture and sound is obtained, as well as a constant film speed at the sound-control point. Irrespective of whether variations in friction and consequent speed variations of the film occur during its travel through the optical apparatus, or whether variations of the motor speed occur for instance due to variation in the supply voltage, the speed of the film at the sound-control point remains constant. At the same time the speed in other parts of the film while it passes the apparatus is so regulated that any asynchronism is kept within allowable and negligible limits.

Figure 2:
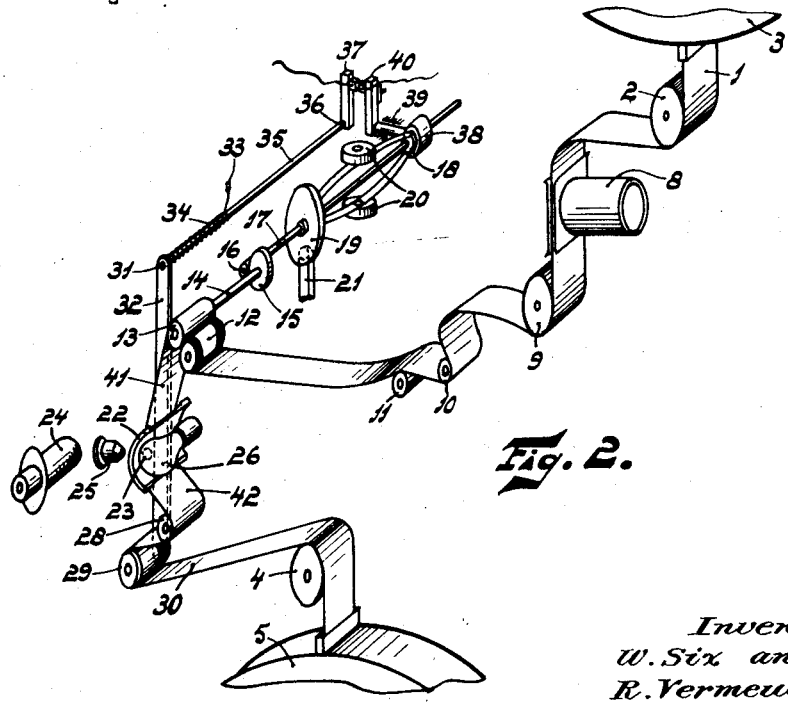

In order that the invention may be clearly understood and readily carried into effect it will be explained more fully with reference to the accompanying drawing which represents, by way of example, one embodiment thereof. In the drawing:

Figure 1 is an elevation of a complete reproducing apparatus according to the invention and Figure 2 is a diagrammatic view of the controlling device employed in the apparatus according to Figure 1.

In the figures, 1 denotes the film which is unwound by a driven roller 2 from a supply drum 3 and which is wound up via a driven roller 4 by a drum 5. The rollers 2 and 4 are both driven by a single motor, preferably an electric motor, which is not shown for the sake of clearness. As appears from Figure 1, the rollers 2 and 4 pertain to an ordinary projection apparatus 6, while in the film portion located between the rollers is made a loop housed in the acoustic portion which is built as a separate unit 7. It is also possible to secure the unitary acoustic portion to the projection apparatus.

The loop with the corresponding controlling device for the driving motor is shown in detail in Figure 2. After having passed the roller 2, the film is drawn past the gate aperture 8 by a roller 9 driven by a device not shown, for example by the known Geneva cross drive, and then passes two rollers 10 and 11 which serve to smooth as much as possible the jerky travel of the film caused by the intermittent drive. This is of importance because, as is well-known, it is advisable to move the film continuously in the acoustic portion 7. Subsequently the film passes two rollers 12 and 13. The spindle 14 of the roller 13 drives the shaft 17 of a centrifugal regulator 18 via a toothed gear coupling 15, 16. The regulator is furnished in the usual manner with a brake disc 19 which in different positions of weights 20 engages a fixed brake shoe 21 with different pressures.

After having passed the rollers 12 and 13 the film is led over a curved guide 22 provided at a point corresponding to the sound strip on the film with an aperture 23. The light of a light source 24, for example an incandescent lamp having a rectilinear filament, passes through an objective lens 25, the film, and the aperture 23 onto a photo-electric cell 26 with the aid of which the acoustic records provided on the film may be converted into electric currents. Although in this embodiment a curved guide is shown, it is also possible to employ a plane guide which is mounted in such manner that owing to the tension in the film the latter bears with a certain pressure against the guide. The cell 26 is coupled with the input circuit of an amplifier 27 shown in Figure 1. For simplicity the amplifier is united with the acoustic portion so as to form a single apparatus and consequently it is transportable together with this portion. This affords the possibility of adapting the acoustic portion by simple means to different types of projection apparatus. For example, the various components of the aggregate may be arranged so as to be replaceable in such manner that the whole of it may be employed both in devices in which the picture projection occurs before or behind the screen and in devices with films in which the sound records are provided to the left or to the right of the series of pictures.

After the guide 22 the film passes a guide roller 28 and a roller 29 arranged in such manner that the loop 30 formed at this point in the film is constantly kept under the same tension. Finally the film is carried by the driven roller 4 to the drum 5.

The tightening roller 29 is mounted on a lever 32 pivoted at 31, and ensures by means of a helical spring 34, one end of which is rigidly clamped at 33 whereas the other end is secured to the lever 32, that the loop 30 has the required tension. Furthermore the lever 32 has secured to it a pin 35 the free end 36 of which carries a contact member 37. On the shaft 17 of the regulator is eccentrically mounted a cam 38 which when rotating imparts a continuous rapid vibratory motion to a pin 39 slidable in the direction of its longitudinal axis, and carrying a contact member 40. Both contact members are connected in known manner into the electric circuit of the driving motor and periodically short-circuit a resistance included in this circuit.

The operation of the regulator is as follows: When the film portion before the guide 22 experiences a small increase or decrease of the frictional resistance produced during the travel, the speed of the roller 13 and therefore that of the regulator slightly decreases or increases with the result that the braking force of the regulator is subject to a large variation. If, for example, the frictional resistance has increased due to the fact that a joint in the film passes the two rollers 12 and 13, the braking effect of the regulator decreases accordingly so that the film constantly experiences the same total resistance. With the same pull of the film the tension in the film portion 41 before the guide 22 consequently remains constant and owing to the fact that the tension in the film portion 42 behind the guide is always maintained at the same value by the tightening roller 29, the film is constantly led with the same tension past the guide and consequently is always in contact with the latter with the same pressure; variation of the distance of the film relatively to the light source and the photo-cell being consequently excluded during the travel. At the point of the guide the film need therefore not be pressed on any further.

Moreover the regulator has the advantage of compensating the shocks produced due to the intermittent drive of the film past the picture gate. It will be evident that for this purpose it is important that the regulator be located before the guide.

The regulator may be employed not only for the above mentioned functions but also in the following manner for the control of the motor speed if the latter should deviate from the value desired: Owing to the regulator the film has at the sound-control point a substantially constant speed. If the speed of the motor is altered for some reason or other, for example due to a variation of the voltage of the network or to the projection apparatus running more stiffly, the length of the film loop behind the guide has, owing to the constant drive by the regulator, the opportunity of increasing or decreasing. This results in the lever 32 with the contact member 37 connected thereto being displaced, which means that the duration of the contact between the two contact members 37 and 40 is altered. The time interval wherein the resistance is short-circuited and therefore the speed of the motor varies accordingly. It is evident that the speed of the film at the picture gate will also be modified but this variation is so small as to be imperceptible to the eye.

As will appear from the above, the device according to the invention makes it possible to guide the film, under any circumstances occurring in normal operation, reliably and at a constant speed along the guide and due to the constant tension exerted on the film during its travel, the film will bear always with a constant pressure on the guide 22, thus insuring that the distance between the film and the light source is maintained constantly at the proper value required for the satisfactory operation of the device.

What we claim is:—

1. A sound film apparatus comprising a film, a sound control point for said film, two driving points for said film, one before and one behind said sound control point, and driving means for moving the film at the driving points, means driven by said film to keep the film speed at the sound control point at a predetermined and constant value irrespective of variations in the speed of the driving means, and means for regulating the speed of said driving means in accordance with the difference between the film speed at the sound control point and at one of said driving points.

2. A sound film apparatus comprising a film and a sound control point for said film, two driving points for said film, one before and one behind said sound control point, driving means for moving the film at the driving points, a centrifugal regulator driven by the film to keep the film speed at the sound control point at a predetermined and constant value, irrespective of variations in the speed of the driving means, and means for regulating the speed of said driving means in accordance with the difference in the film speeds at the sound control point and at one of said driving points.

3. A sound film apparatus comprising a film, a sound control point for said film, two driving points for said film, one before and one behind the sound control point, and driving means for moving the film at said driving points, means driven by said film to keep the film speed at the sound control point at a predetermined and constant value, irrespective of variations in the speed of the driving means, and regulating means controlling the speed of said driving means, comprising a loop in said film between the sound control point and one of said driving points, a spring-actuated lever having a roller and a contact thereon, said roller engaging and tightening said loop, a second contact cooperating with said first contact and having a vibrating motion, and an electric circuit including said contacts and said driving means, said regulating means controlling the speed of the driving means in accordance with the periodic closure time of said contacts.

4. A sound film apparatus comprising a film, a sound control point for said film, two driving points for said film, one before and one behind said sound control point, driving means for moving the film at the driving points, a centrifugal speed regulator driven by the film to keep the film speed at the sound control point at a predetermined and fixed value, irrespective of variations in the speed of the driving means, and regulating means for controlling the speed of said driving means, comprising a loop in said film between the sound control point and one of said driving points, a spring-actuated lever having a roller and a contact mounted thereon, said roller engaging and tightening said loop, a second contact having a vibrating motion and cooperating with said first contact, and an electric circuit including said contacts, said regulating means controlling the speed of said driving means in accordance with the periodic closure time of said contacts.

WILLEM SIX.
ROELOF VERMEULEN.